US008154495B2

(12) United States Patent
Hsu

(10) Patent No.: US 8,154,495 B2
(45) Date of Patent: Apr. 10, 2012

(54) MULTI-SWITCH HALF SOURCE DRIVING DISPLAY DEVICE AND METHOD FOR LIQUID CRYSTAL DISPLAY PANEL

(75) Inventor: Wen-Fa Hsu, Hsinchu (TW)

(73) Assignee: Au Optronics Corporation, Hsinchu (TW)

(*) Notice: Subject to any disclaimer, the term of this patent is extended or adjusted under 35 U.S.C. 154(b) by 784 days.

(21) Appl. No.: 11/617,742

(22) Filed: Dec. 29, 2006

(65) Prior Publication Data

US 2008/0048963 A1 Feb. 28, 2008

(30) Foreign Application Priority Data

Aug. 22, 2006 (TW) .............................. 95130774 A

(51) Int. Cl.
*G09G 3/36* (2006.01)
*G06F 3/038* (2006.01)
*G02F 1/1347* (2006.01)

(52) U.S. Cl. ............................ 345/96; 345/209; 349/77

(58) Field of Classification Search ............ 345/87–104, 345/209; 349/77, 78, 80, 104, 106
See application file for complete search history.

(56) References Cited

U.S. PATENT DOCUMENTS 5,448,258 A * 9/1995 Edwards ........................ 345/90
6,075,505 A * 6/2000 Shiba et al. ..................... 345/87
6,075,507 A * 6/2000 Miyahara et al. ............... 345/89
6,429,842 B1 * 8/2002 Shin et al. ....................... 345/92
6,833,888 B2 * 12/2004 Song et al. .................... 349/106
6,859,195 B2 * 2/2005 Kodate ........................... 345/92
7,420,533 B2 * 9/2008 Yun ................................ 345/96
7,633,472 B2 * 12/2009 Edwards ......................... 345/87
2001/0015715 A1 * 8/2001 Hebiguchi et al. .............. 345/92
2005/0140638 A1 * 6/2005 Lee et al. ...................... 345/100
2005/0231455 A1 * 10/2005 Moon ............................. 345/89
2006/0164363 A1 * 7/2006 Battersby et al. ............... 345/98
2007/0176874 A1 * 8/2007 Yeh ................................ 345/92

FOREIGN PATENT DOCUMENTS

| | | |
|---|---|---|
| CN | 1637532 | 7/2005 |
| JP | 04-309926 | 11/1992 |
| JP | 11-337911 | 12/1999 |
| JP | P2006-500617 | 1/2006 |
| TW | 200617499 | * 6/2006 |

OTHER PUBLICATIONS

"Office Action of Japan Counterpart Application" issued on May 18, 2010, p. 1-p. 2.

* cited by examiner

*Primary Examiner* — Bipin Shalwala
*Assistant Examiner* — Keith Crawley
(74) *Attorney, Agent, or Firm* — Jianq Chyun IP Office

(57) ABSTRACT

The present invention discloses a method for improving the image quality of a MSHD (Multi-Switch Half source Driving) display panel and a device used the same. The method comprising following steps: First, using a polarity-line-inversion source driver to drive a plurality of pixels of a MSHD display panel, then a frame displaying in polarity-dot-inversion. The device comprises a polarity-line-inversion source driver and a MSHD display panel, wherein the polarity-line-inversion source driver drives a plurality of pixels of the MSHD display panel. The pixels of the MSHD display panel displays a frame in polarity-dot-inversion form.

13 Claims, 11 Drawing Sheets

| | S1 | S2 | S3 | S4 | S5 | S6 |
|---|---|---|---|---|---|---|
| | R | G | B | R | G | B |
| G0 | (1,1) | (1,2) | (1,3) | (1,4) | (1,5) | (1,6) |
| G1 | (2,1) | (2,2) | (2,3) | (2,4) | (2,5) | (2,6) |
| G2 | (3,1) | (3,2) | (3,3) | (3,4) | (3,5) | (3,6) |
| G3 | (4,1) | (4,2) | (4,3) | (4,4) | (4,5) | (4,6) |

FIG. 3

| | S1 | S2 | S3 | S4 | S5 | S6 |
|---|---|---|---|---|---|---|
| | R | G | B | R | G | B |
| G0 | + | + | + | + | + | + |
| G1 | + | + | + | + | + | + |
| G2 | + | + | + | + | + | + |
| G3 | + | + | + | + | + | + |

FIG. 4A

| | S1 | S2 | S3 | S4 | S5 | S6 |
|---|---|---|---|---|---|---|
| | R | G | B | R | G | B |
| G0 | + | − | + | − | + | − |
| G1 | + | − | + | − | + | − |
| G2 | + | − | + | − | + | − |
| G3 | + | − | + | − | + | − |

FIG. 4B

S1 S3 S5

S2 S4 S6

| | R | G | B | R | G | B |
|---|---|---|---|---|---|---|
| G0 | + | + | + | + | + | + |
| G1 | − | − | − | − | − | − |
| G2 | + | + | + | + | + | + |
| G3 | − | − | − | − | − | − |

FIG. 4C

S1 S3 S5

S2 S4 S6

| | R | G | B | R | G | B |
|---|---|---|---|---|---|---|
| G0 | + | − | + | − | + | − |
| G1 | − | + | − | + | − | + |
| G2 | + | − | + | − | + | − |
| G3 | − | + | − | + | − | + |

FIG. 4D

S1 S3 S5

S2 S4 S6

| | R | G | B | R | G | B |
|---|---|---|---|---|---|---|
| G0 | + | − | + | − | + | − |
| G1 | + | − | + | − | + | − |
| G2 | − | + | − | + | − | + |
| G3 | − | + | − | + | − | + |

FIG. 4E

Replacement Sheet

MULTI-SWITCH HALF SOURCE DRIVING DISPLAY DEVICE AND METHOD FOR LIQUID CRYSTAL DISPLAY PANEL

CROSS-REFERENCE TO RELATED APPLICATION

This application claims the priority benefit of Taiwan application serial no. 95130774, filed on Aug. 22, 2006. All disclosure of the Taiwan application is incorporated herein by reference.

BACKGROUND OF THE INVENTION

1. Field of the Invention

The present invention relates to a method for improving image quality and a device used the same; particularly, relates to a method for improving the image quality of MSHD (Multi-Switch Half source Driving) display panel and a device used the same.

2. Description of Related Art

FIG. 1 is a circuit block diagram of a conventional liquid crystal display. This conventional liquid crystal display includes a gate driver 101, a polarity-dot-inversion source driver 102, and a conventional liquid crystal display panel 103. The gate driver 101 includes a plurality of integrated circuits GD1~GDn which are used to turn on and turn off a thin film transistor. The source driver 102 includes a plurality of integrated circuits SD1~SDM which are used to output data to a liquid crystal capacitor and supply a voltage to the capacitor when the thin film transistor is turned on. Each source line outputs only one pixel data during each horizontal line period. Such conventional liquid crystal panel is called single pixel driving LCD panel. FIG. 2 is a circuit diagram of a conventional LCD panel 103. Take an example of one pixel in FIG. 2. When the thin film transistor T1 is turned on by the gate line G0, the source line Sn outputs data to the liquid crystal capacitor C1.

FIG. 3 is a distribution diagram showing the parts of the pixel of the conventional LCD panel 103. The R, G, and B indicate red color, green color and blue color respectively. For example, (1,1) (2,1) (3,1) (4,1) (1,4) (2,4) (3,4) (4,4) are red pixels.

The data write-in steps for those pixels are as follows. Firstly, the gate line G0 turns on the thin film transistor of (1,1)~(1,6) pixels and the sources line S1~S6 output data simultaneously. Next, the gate line G1 turns on the thin film transistor of (2,1)~(2,6) pixels and the source lines S1~S6 output data simultaneously. The gate lines G2, G3, . . . etc. are in a similar way. In order to prevent the liquid crystal from polarizing, it is necessary to use a polarity inversion driver for the liquid crystal molecular. FIG. 4A~FIG. 4E are the distribution diagrams respectively showing the type of the polarity of the parts of the pixels in FIG. 3.

Symbol + represents that the data voltage supplied to the pixel is larger than the common voltage Vcom where the data voltage with respect to the common voltage Vcom is positive. Symbol – represents that the data voltage supplied to the pixel is smaller than the common voltage Vcom where the data voltage with respect to the common voltage Vcom is negative. Referring to FIG. 3, 4A~4D are distribution diagrams respectively showing the polarity of frame inversion, column inversion, line inversion and dot inversion. FIG. 4E is a diagram showing polarity of 2-dot inversion which can solve, for example, the situation of the frame flickering when turn off the operating system, e.g. MICROSOFT WINDOWS. In general, each source line of the conventional liquid crystal display outputs only one pixel data during each horizontal line period. The driving polarity of the pixels is mostly dot inversion thereof. Since the image quality is better than other driving polarity.

In order to decrease the number of the source drivers and source lines of the conventional liquid crystal display, FIG. 5 shows a circuit diagram of a MSHD display panel. The characteristic is that each source line outputs two pixels data during each horizontal line period, so the number of the source drivers and source lines of the panel module are half decreased. The dotted line means the parts of source line decreased; meanwhile, the conventional driver IC can still be used for source and gate driver circuit without redesign to achieve lowering the cost. Further, the difference of the designed timing controller between a MSHD display and the conventional LCD thereof is a memory control circuit and a signal generator controlled by the gate driver. Using a source line buffer controller to rearrange the pixels data in a buffer area so as to reach multiplexing purpose. Furthermore, the signal generator controlled by the gate driver generates a proper controlled signal to turn on the thin film transistor of assigned pixel to complete the write-in process. For example, when the gate line G2 turns on the thin film transistor T2, the source line Sn outputs data to the liquid crystal capacitor C2. Further, when the gate lines G1 and G2 turn on the thin film transistors T2 and T3 simultaneously, the source line Sn outputs data to the liquid crystal capacitor C3.

FIG. 6A is a distribution diagram showing the parts of the pixel of the MSHD display panel in FIG. 5. As the numbers of the source driver and source lines are half decreased; therefore, the data write-in steps of MSHD display panel is different from the single pixel driving LCD panel. The data write-in steps are as follows. Firstly, gate lines G0, G1 turn on the thin film transistors of (1,2) (1,4) (1,6) pixels and the source lines S1~S3 output data simultaneously. Secondly, gate lines G1, G2 turn on the thin film transistors of (2,2) (2,4) (2,6) and the source lines S1~S3 output data simultaneously. After that, gate line G1 turns on the thin film transistor of (1,1) (1,3) (1,5) and the sources line S1~S3 output data simultaneously. Next, gate lines G2, G3 turn on the thin film transistors of (3,2) (3,4) (3,6) and the source lines S1~S3 output data simultaneously. Then, gate line G2 turns on the thin film transistor of (2,1) (2,3) (2,5) and the source lines S1~S3 output data simultaneously. The others are all in the same way. FIG. 6B is a diagram showing the parts of the pixel write-in order of the MSHD display panel as shown in FIG. 5. The write-in order of MSHD display panel is different from the single pixel driving LCD panel which makes the driving polarity of MSHD display panel does not belong to any types of FIG. 4A-4E. Turn on the panel as a whole, it is not entirely the dot inversion. Except the difference of the data write-in order, the source driver used on the conventional liquid crystal display is dot inversion; namely, the polarity of the neighboring output is opposite at the same timing.

FIG. 7 is a circuit block diagram showing the dot inversion source driver integrated circuit. Such as at the same timing, source lines S1, S3, Sn-3, Sn-1 output the positive polarity while S2, S4, Sn-2 and Sn output the negative polarity. To further cooperate with the data write-in steps of the MSHD display panel, refer to FIG. 6A, the steps are as follows. Firstly, gate lines G0, G1 turn on the thin film transistor of (1,2) (1,4) (1,6) pixels and the source lines S1~S3 output data simultaneously wherein (1,2) (1,6) are positive and (1,4) is negative. Secondly, gate lines G1, G2 turn on the thin film transistor of (2,2) (2,4) (2,6) and the source lines S1~S3 output data simultaneously wherein (2,4) is positive and (2,2) (2,6) are negative. Next, gate line G1 turns on the thin film transistor of (1,1) (1,3) (1,5) and the source lines S1~S3 output data simultaneously wherein (1,3) is positive and (1,1) (1,5) are negative. Then, gate lines G2, G3 turns on the thin film transistor of (3,2) (3,4) (3,6) and the source lines S1~S3 output data simultaneously where in (3,2) (3,6) are positive and (3,4) is negative. FIG. 8 is a distribution diagram showing parts of the pixel polarity of MSHD display panel with the dot inversion source driver which is a 1+2 dot inversion driving polarity in horizontal direction. FIG. 9A~9C are distribution diagrams showing parts of the pixel polarity displayed in single color as shown in FIG. 8. In FIG. 9A and 9B, when the frame displays red or blue, the driving polarity of the panel is horizontal line inversion. In FIG. 9C, when the frame displays green, the driving polarity of the panel is dot inversion. The dot inversion source driver hardly makes each single color frame to be dot inversion and thereby cause crosstalk.

SUMMARY OF THE INVENTION

A device for improving the image quality of MSHD display panel is provided in the present invention, which comprises: a source driver; and a MSHD display panel, wherein the source driver drives the MSHD display panel by means of polarity-line-inversion, and the MSHD display panel displays a polarity-dot-inversion frame.

According to one embodiment of the present invention, the MSHD display panel device comprises a plurality of gate lines and a plurality of sources lines, wherein the Mth gate line of the plurality of gate lines is coupled to the gate electrode of the first thin film transistor, the (M+1)th gate line of the plurality of gate lines is coupled to the gate electrode of the second thin film transistor, the Nth source line of the plurality of source lines is coupled to the source electrode of the second thin film transistor. The source electrode of the first thin film transistor is coupled to the drain electrode of the second thin film transistor thereof. The drain electrode of the first transistor is coupled to capacitor of the first pixel. The drain electrode of the second thin film transistor is coupled to capacitor of the second pixel.

A method for improving the image quality of MSHD display panel is provided in the present invention. The polarity dot inversion distribution can be achieved while displaying single color, lowering the horizontal crosstalk and improving image quality are achieved as well.

A method for improving the image quality of MSHD display panel is provided in the present invention. The polarity line inversion distribution can be avoided while displaying single color, thereby achieving the advantages of lowering the horizontal crosstalk and improving image quality.

A method for improving the image quality of MSHD display panel is provided in the present invention, which comprises the following steps: using a source driver to drive a plurality of pixels of a MSHD display panel by means of polarity-line-inversion; and the MSHD display panel displays a polarity-dot-inversion frame.

According to one embodiment of the present invention, the aforementioned MSHD display panel comprises a plurality of source lines which are coupled to the source driver and a plurality of gate lines which are coupled to the gate driver. Each source line and two corresponding gate lines drive two pixels.

According to one embodiment of the present invention, the method of displaying a frame in polarity-dot-inversion on the MSHD display panel comprises the following steps: firstly, driving the first pixel of a plurality of pixels located in K line. Secondly, driving the second pixel of the pixels thereof located in K+1 line. Next, driving the third pixel of the pixels located in K line, wherein K is a natural number.

In the device for improving the image quality of a MSHD display panel according an embodiment of the present invention, the outputted polarities of the source drivers are the same in the same time sequence.

In the present invention, the MSHD display panel comprises a color filter which comprises a plurality of red blocks, a plurality of green blocks, and a plurality of blue blocks, in which the plurality of red blocks, the plurality of green blocks and the plurality of blue blocks are interlaced with each other.

In the present invention, a MSHD display panel using a polarity-line-inversion source driver is applied. Therefore, the frame in polarity-dot-inversion distribution is displayed, so as to lower the horizontal crosstalk and to improve the image quality.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a distribution diagram showing the parts of the pixel locations of the liquid crystal panel 103.

FIG. 4A is a distribution diagram showing the polarity of parts of the pixels in FIG. 3.

FIG. 4B is a distribution diagram showing another polarity of parts of the pixels in FIG. 3.

FIG. 4C is a distribution diagram showing the further polarity of parts of the pixels in FIG. 3.

FIG. 4D is a distribution diagram showing the further polarity of parts of the pixels in FIG. 3.

FIG. 4E is a distribution diagram showing the further another polarity of parts of the pixels in FIG. 3.

DESCRIPTION OF EMBODIMENTS

Figure 1:
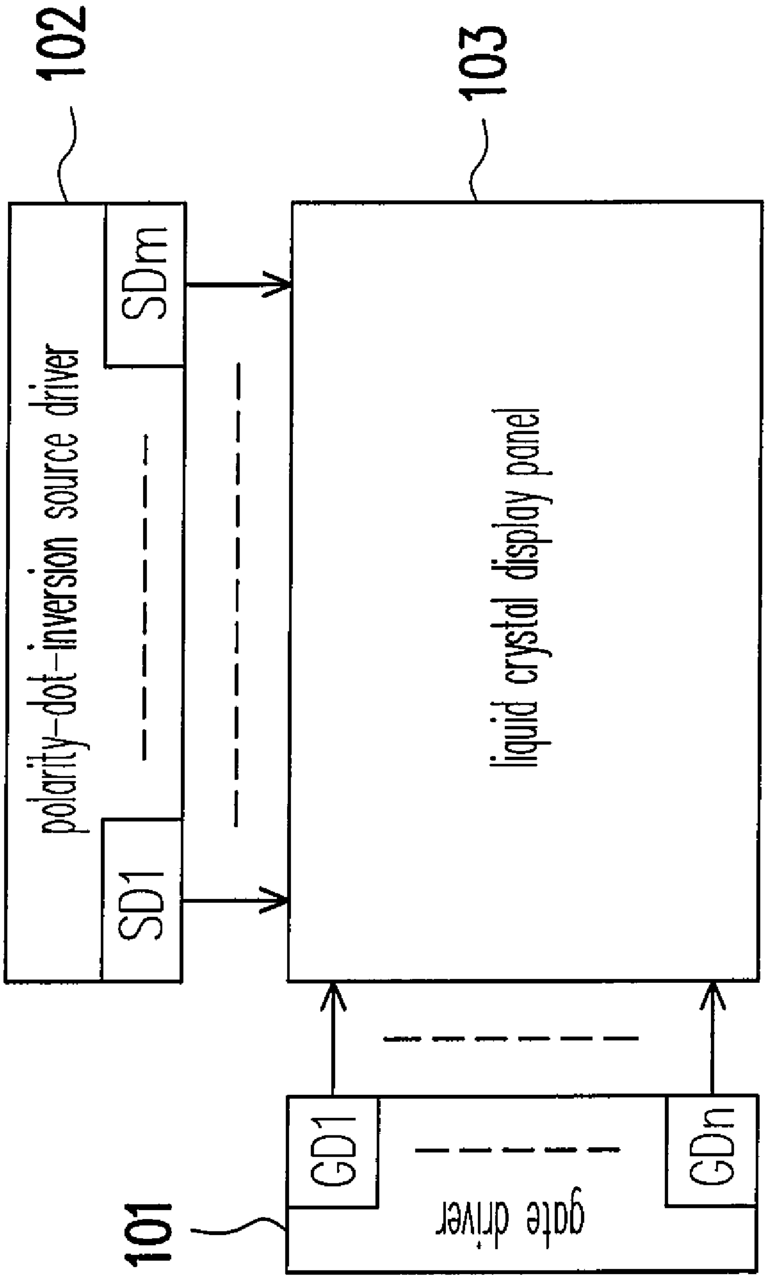
FIG. 1 is a circuit block diagram showing a conventional liquid crystal display.
Figure 2:
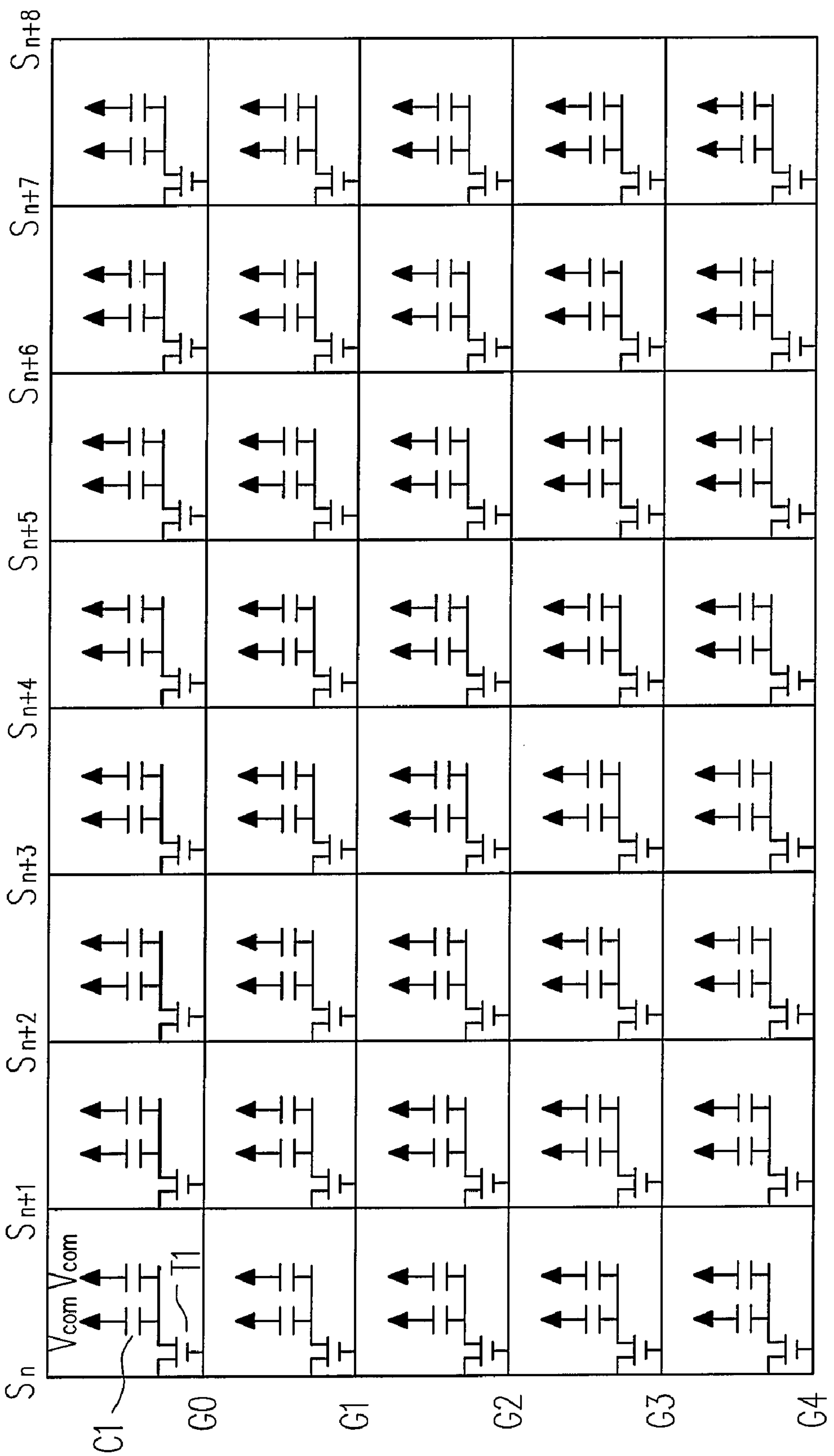
FIG. 2 is a circuit diagram of a conventional liquid crystal display panel 103.

Reference will now be made in detail to the present preferred embodiments of the invention, examples of which are illustrated in the accompanying drawings. Wherever possible, the same reference numbers are used in the drawings and the description to refer to the same or like parts.

Figure 10:
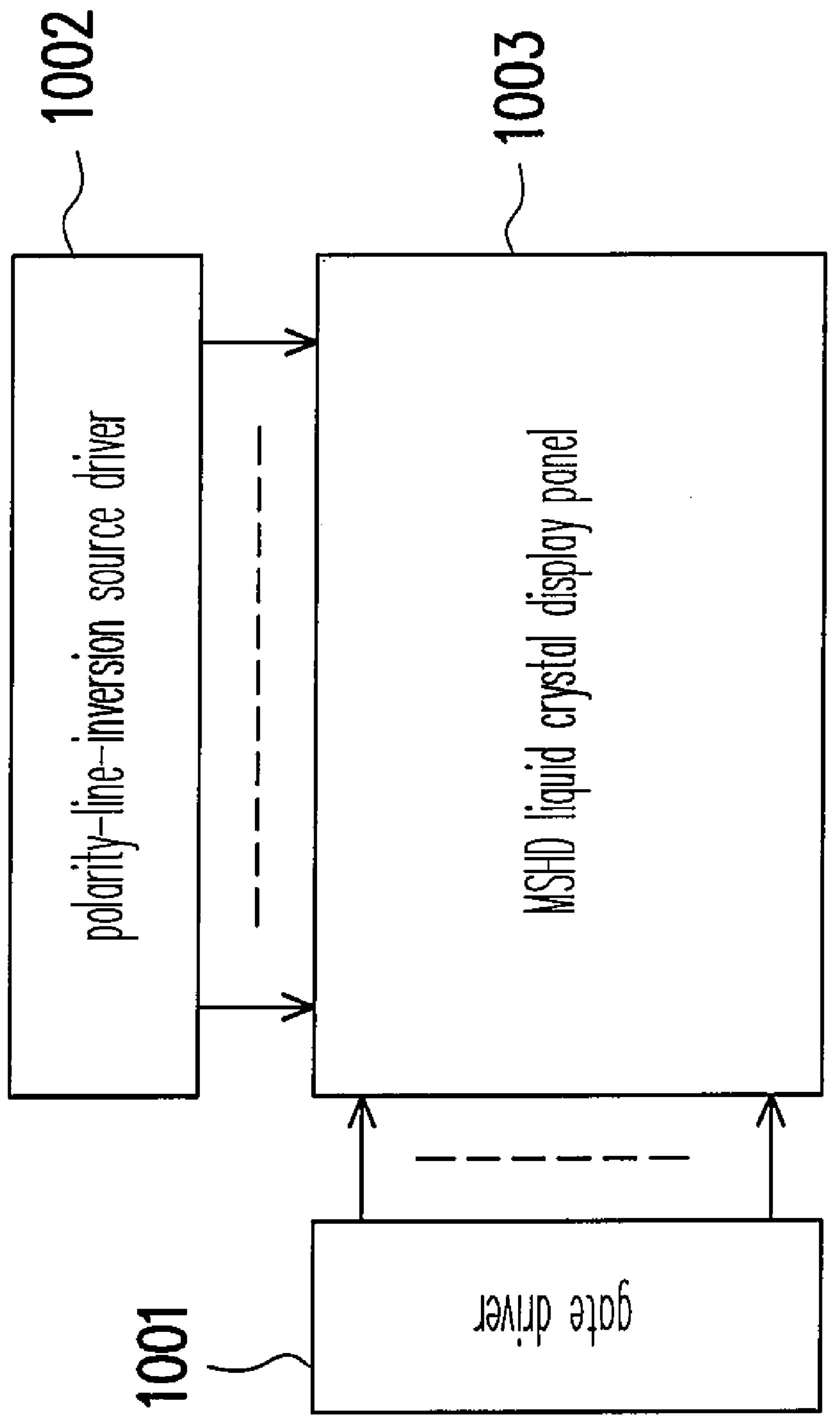
FIG. 10 shows a device for improving the image quality of a MSHD display panel according to an embodiment of the present invention.
Figure 11:
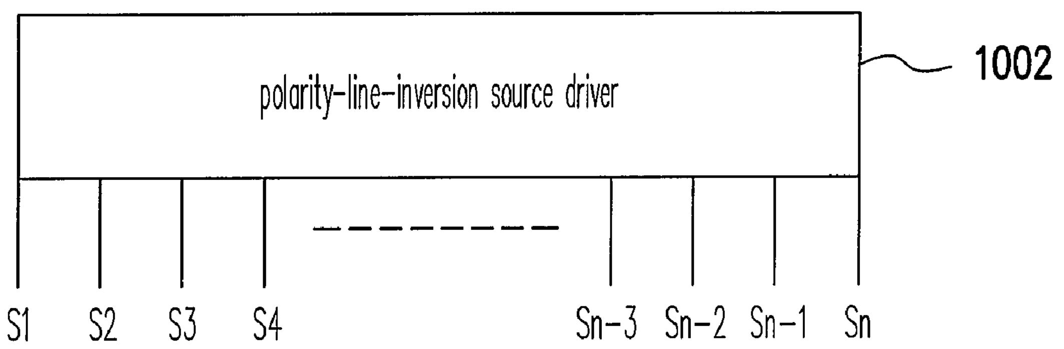
FIG. 11 is a circuit block diagram showing a polarity-line-inversion source driver 1002.

According to one embodiment of the present invention, a device for improving the image quality of MSHD display panel is provided, as shown in FIG. 10. The device comprises a polarity-line-inversion source driver 1002, a gate driver 1001, and a MSHD display panel 1003. The polarity-line-inversion source driver 1002 drives a plurality of pixels of MSHD display panel 1003 by means of polarity-line-inversion. The MSHD display panel 1003 displays a frame in polarity dot inversion distribution. FIG. 11 is a circuit block diagram showing the polarity-line-inversion source driver 1002 and the corresponding source lines S1~Sn of an embodiment of the present invention. Each output polarity of the polarity-line-inversion source driver is identical while it is at the same timing sequence; namely, the output polarities of the source lines S1, S2~Sn-1 and Sn are identical and can be integrated changed according to the timing sequence. Therefore, the MSHD display panel 1003 using the polarity-line-inversion source driver will result in polarity-dot-inversion.

Figure 5:
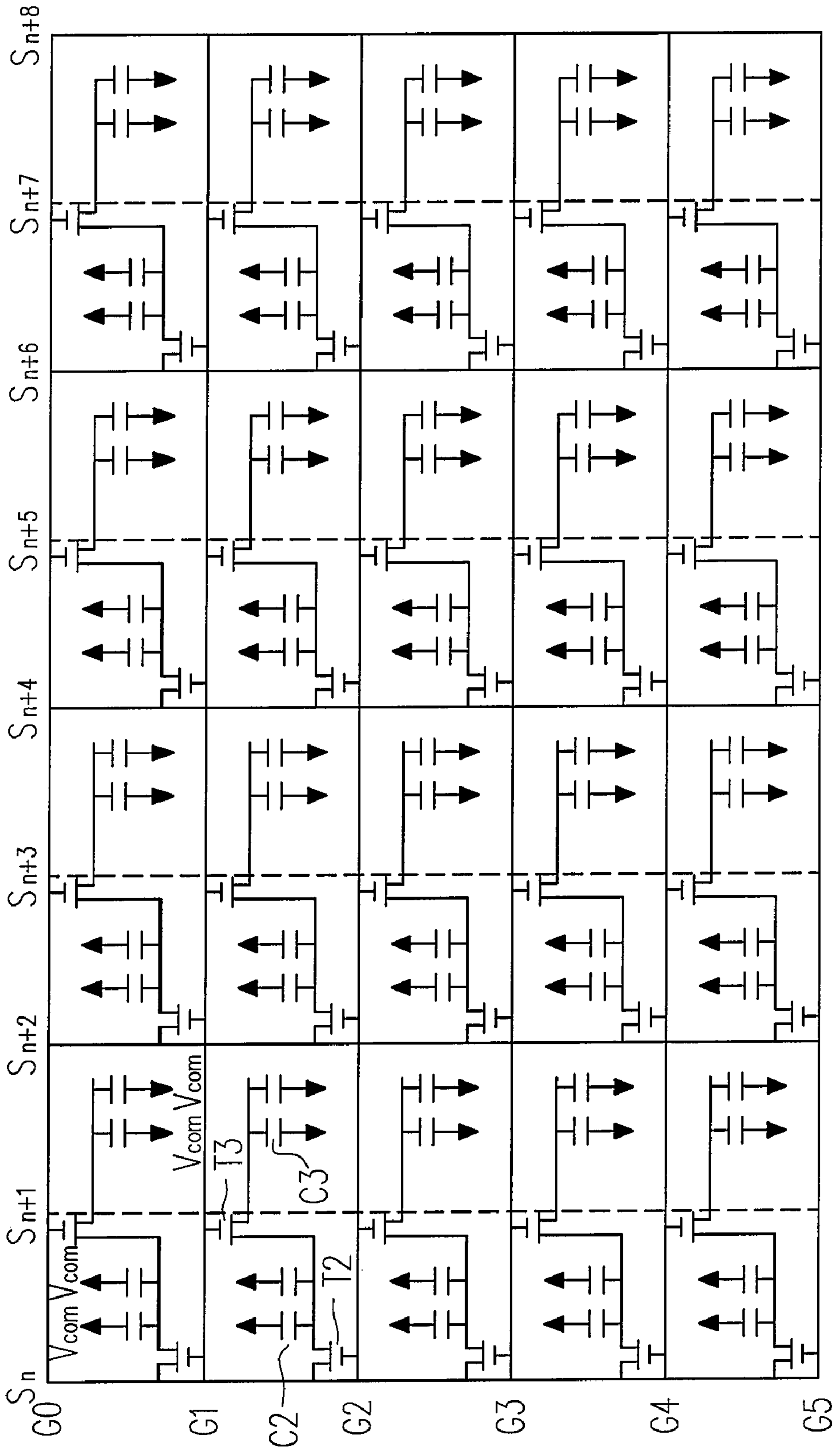
FIG. 5 is a circuit diagram showing the MSHD display panel.

The MSHD display panel 1003 is provided with the structure of FIG. 5. The gate line G1 is coupled to the gate of transistor T3. The gate line G2 is coupled to the gate of the transistor T2. The source line Sn is coupled to the source of transistor T2. The drain of the transistor T3 is coupled to pixel capacitor C3. Furthermore, the source of that transistor T3 is coupled to the drain of the transistor T2 which is coupled to the pixel capacitor C2. The MSHD display panel 1003 comprises the driving order of FIG. 6B. By setting K is a natural number, the first pixel (order 1 in FIG. 6B) of those pixels located in the K line is driven first; the second pixel (order 1) of those pixels located in the K+1 line is driven secondly; and the third pixel (order 3) of those pixels located in the K line is then driven thirdly, the rest orders of 4 to 9 are in the similar way.

Figure 6A:
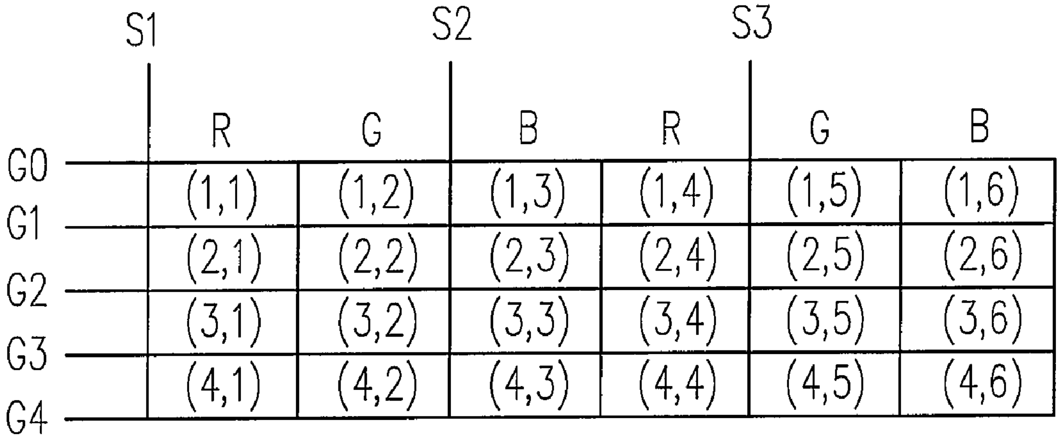
FIG. 6A is a distribution diagram showing the parts of the pixel location of the MSHD display panel in FIG. 5.
Figure 6B:
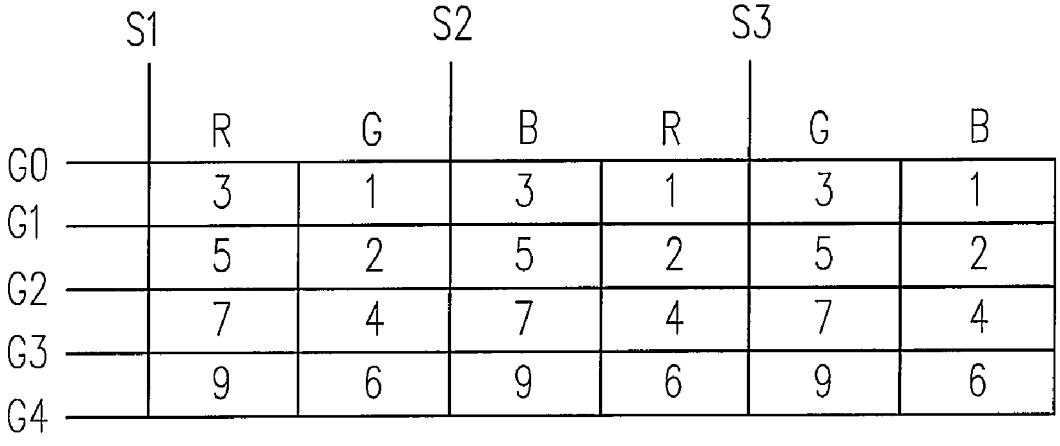
FIG. 6B is a diagram showing the parts of the pixel write-in order of the MSHD display panel in FIG. 5.
Figure 7:
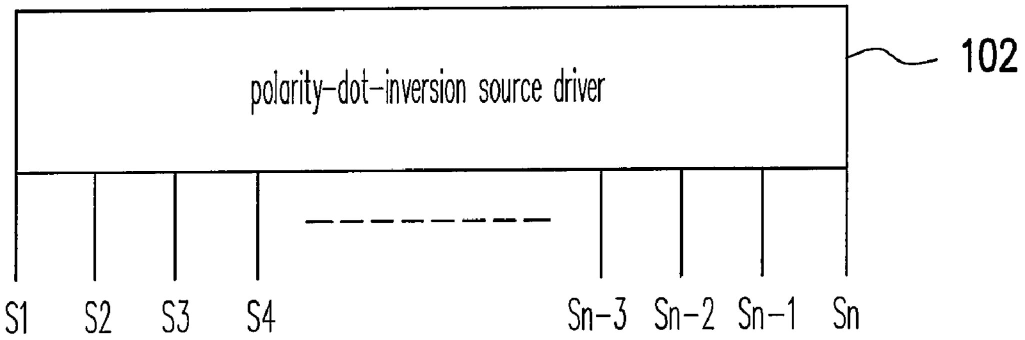
FIG. 7 is a circuit block diagram showing a polarity-dot-inversion source driver circuit.
Figure 8:
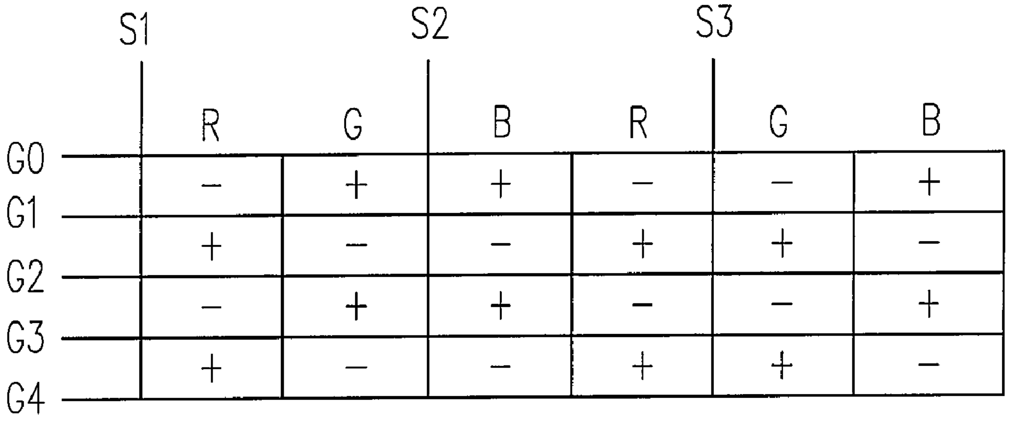
FIG. 8 is a distribution diagram showing the polarity of parts of the pixels of a MSHD display panel using a polarity-dot-inversion source driver.
Figure 9A:
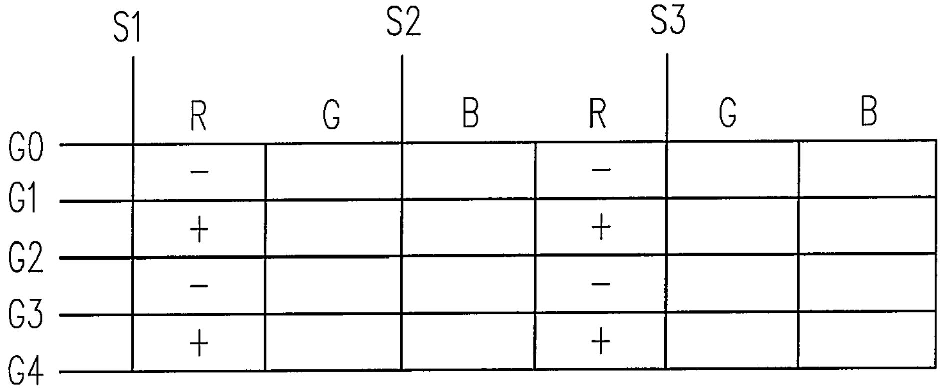
FIG. 9A is a distribution diagram showing parts of the pixel polarity displayed in single color in FIG. 8.
Figure 9B:
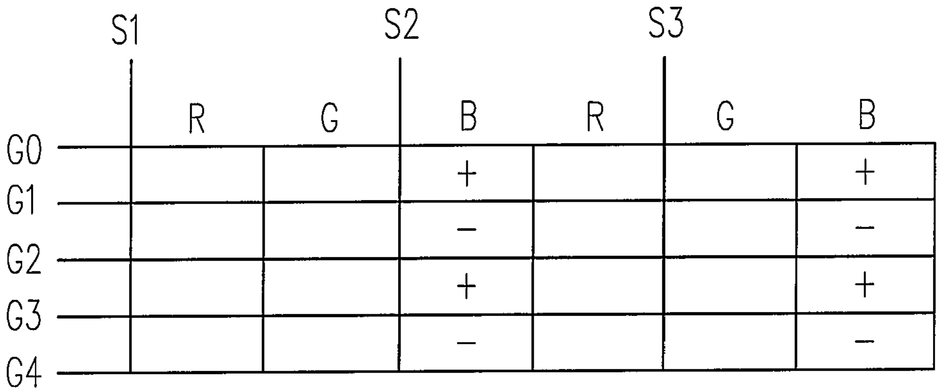
FIG. 9B is a distribution diagram showing another polarity of parts of the pixel displayed in single color in FIG. 8.
Figure 9C:
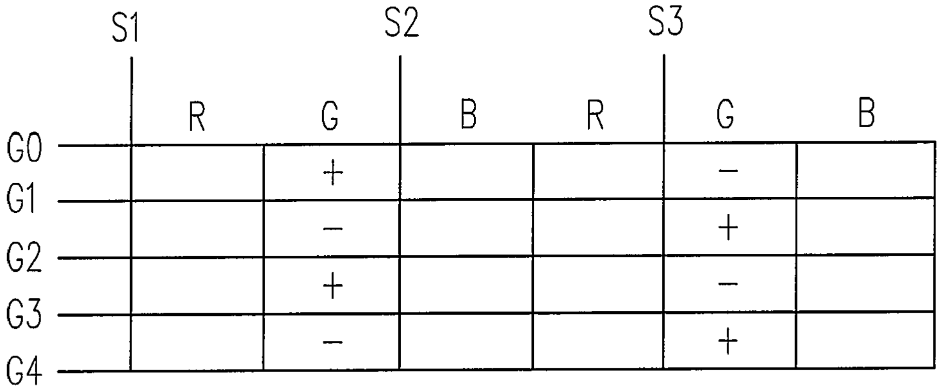
FIG. 9C is a distribution diagram showing further polarity of parts of the pixel displayed in single color in FIG. 8.
Figure 12:
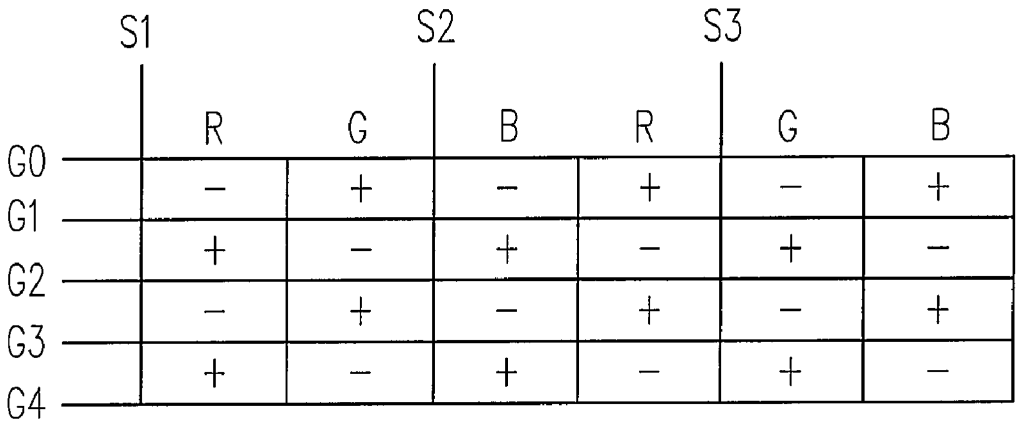
FIG. 12 is polarity diagram showing parts of the pixels of a MSHD display panel in an embodiment of the present invention.

FIG. 12 is polarity diagram showing parts of the pixels of a MSHD display panel of an embodiment of the present invention. FIG. 6A can be used to define the location of the pixel. R represents red, G represents green, and B represents blue. The MSHD display panel 1003 includes a color filter (not shown in the figure) having a plurality of red blocks, a plurality of green blocks, and a plurality of blue blocks, in which those red blocks, green blocks and blue blocks are in interlaced arrangement and installation. Referring to FIG. 6A and 12, the data write-in steps of those pixels are as follows. Firstly, gate lines G0, G1 turn on the thin film transistors of (1,2) (1,4) (1,6) pixels and the source lines S1~S3 output data simultaneously wherein (1,2) (1,4) (1,6) pixels are all positive polarity. Secondly, gate lines G1, G2 turn on the thin film transistor of (2,2) (2,4) (2,6) pixels and the source lines S1~S3 output data simultaneously wherein (2,2) (2,4) (2,6) pixels are all negative polarity. Next, gate line G1 turns on the thin film transistor of (1,1) (1,3) (1,5) pixels and the source lines S1~S3 output data simultaneously wherein (1,1) (1,3) (1,5) pixels are all negative polarity. Then, gate lines G2 and G3 turn on the thin film transistor of (3,2) (3,4) (3,6) pixels and the source lines S1~S3 output data simultaneously wherein (3,2) (3,4) (3,6) pixels are all positive polarity. Then, gate line G2 turns on the thin film transistor of (2,1) (2,3) (2,5) pixels and the source lines S1~S3 output data simultaneously wherein (2,1) (2,3) (2,5) pixels are all positive polarity.

Figure 13A:
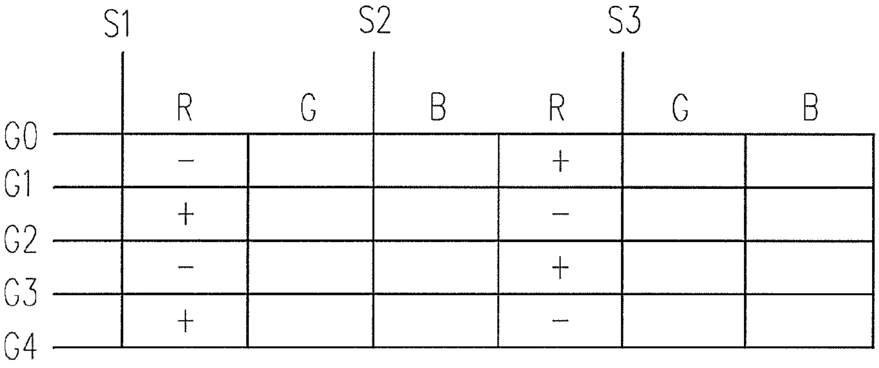
FIG. 13A is a distribution diagram showing parts of the pixel polarity displayed in single color in FIG. 12.
Figure 13B:
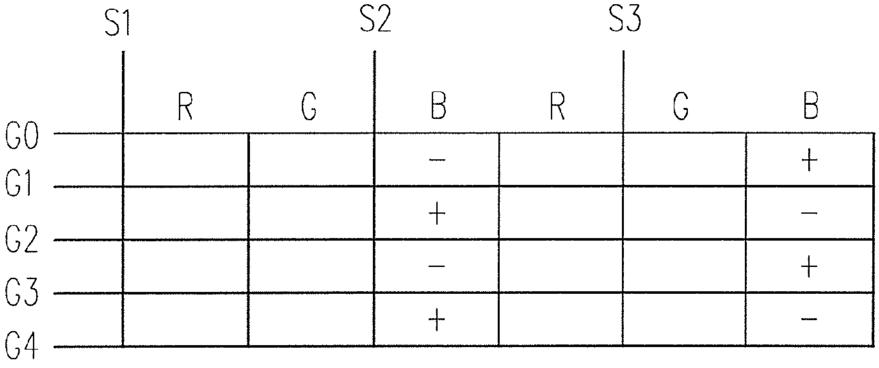
FIG. 13B is a distribution diagram showing parts of the pixel polarity displayed in single color in FIG. 12.
Figure 13C:
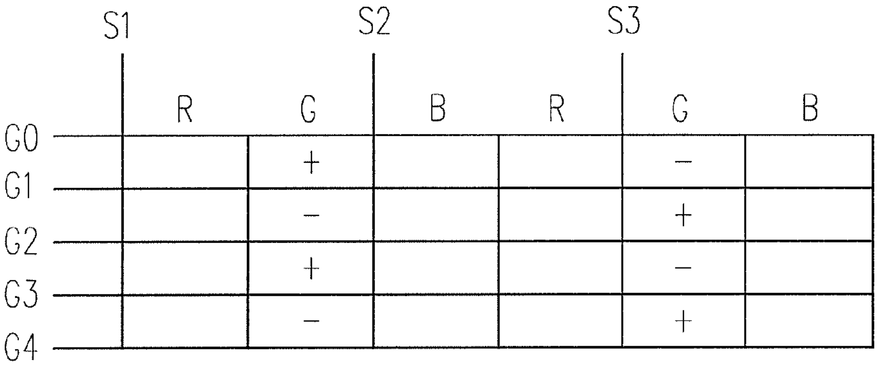
FIG. 13C is a distribution diagram showing further polarity of parts of the pixel displayed in single color in FIG. 12.

As shown in FIG. 12, although a polarity-line-inversion source driver is used in the MSHD display panel, a polarity-dot-inversion display frame can be achieved so as to improve the image quality. FIG. 13A to 13C is a distribution diagram showing parts of the pixel polarity by displaying the single color as shown in FIG. 12. Thus, no matter it is in whole color or a single color, the displaying frame in polarity-dot-inversion is achieved.

The driving method of a preferred embodiment of the present invention is adopted for any MSHD display panel driven interlaced between each line. Futhermore, as known by those skilled in the art, it is not limited to, the circuit structure of the MSHD display panel of the aforementioned embodiments, another circuit structure also can be adopted.

In the present invention, using a polarity-line-inversion source driver to drive a MSHD display panel is applied. Therefore, showing a polarity-dot-inversion frame thereof is achievable so as to lower the horizontal crosstalk and to improve the image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the appending claims and their equivalents.

What is claimed is:

1. A device for improving the image quality of a MSHD (Multi-Switch Half source Driving) display panel, comprising:

a source driver; and a MSHD display panel comprising a plurality of red pixels, green pixels, blue pixels, a plurality of gate lines, a plurality of first thin film transistors, and a plurality of second thin film transistors, wherein the source driver drives the red pixels, the green pixels, and the blue pixels of the MSHD display panel in a polarity-line-inversion form, wherein each output polarity of the polarity-line-inversion source driver is identical at a same timing sequence and the red pixels, the green pixels, and the blue pixels are individually displayed in a polarity-dot-inversion form, and the Mth gate line of the gate lines is coupled to a gate electrode of the Mth first thin film transistor of the first thin film transistors, the (M+1)th gate line of the gate lines is coupled to a gate electrode of the Mth second thin film transistor of the second thin film transistors and a gate electrode of the (M+1)th first thin film transistor of the first thin film transistors.

2. The device of claim 1, wherein the MSHD display panel comprises a plurality of source lines coupled to the source driver, and the gate lines are coupled to a gate driver, each source line and two corresponding gate lines drive two pixels.

3. The device of claim 2, wherein the Nth source line of the plurality of source lines is coupled to a source electrode of the second thin film transistor, wherein the source electrode of the first thin film transistor is coupled to the drain electrode of the second thin film transistor.

4. The device of claim 1, wherein the MSHD display panel comprises a color filter which comprises a plurality of red blocks, a plurality of green blocks, and a plurality of blue blocks, in which the plurality of red blocks, the plurality of green blocks and the plurality of blue blocks are interlaced with each other.

5. The device of claim 1, wherein the MSHD display panel is a liquid crystal panel.

6. A method for improving the image quality of a MSHD (Multi-Switch Half source Driving) display panel, comprising:

driving a plurality of red pixels, green pixels, and blue pixels of the MSHD display panel by using a source driver in a polarity-line-inversion form, wherein each output polarity of the polarity-line-inversion source driver is identical at the same timing sequence; and individually displaying the red pixels, the green pixels, and the blue pixels in a polarity-dot-inversion form, wherein the method further comprises:

driving a first pixel of the pixels which is located in the K line by turning on two adjacent gate lines of a plurality of gate lines, where K is a natural number.

7. The method of claim 6, wherein the MSHD display panel comprises a plurality of source lines coupled to the source driver, and the gate lines are coupled to a gate driver, each source line and two corresponding gate lines drive two pixels.

8. The method of claim 6, further comprising the following steps:

driving a second pixel of the pixels which is located in the K+1 line; and driving a third pixel of the pixels which is located in the K line.

9. The method of claim 6, wherein the MSHD display panel comprises a color filter which comprises a plurality of red blocks, a plurality of green blocks, and a plurality of blue blocks, in which the plurality of red blocks, the plurality of green blocks and the plurality of blue blocks are interlaced with each other.

10. The method of claim 6, wherein the MSHD display panel is a liquid crystal panel.

11. A device for improving the image quality of a MSHD (Multi-Switch Half source Driving) display panel, comprising:

a source driver; and a MSHD display panel comprising a plurality of red pixels, green pixels, and blue pixels, a plurality of first thin film transistors, and a plurality of second thin film transistors, wherein the source driver drives the red pixels, the green pixels, and the blue pixels of the MSHD display panel in a polarity-line-inversion form, wherein each output polarity of the polarity-line-inversion source driver is identical at the same timing sequence, and the red pixels, the green pixels, and the blue pixels are individually displayed in a polarity-dot-inversion form;

wherein the MSHD display panel comprises a plurality of source lines coupled to the source driver, and a plurality of gate lines coupled to a gate driver, each source line and two corresponding gate lines drive two pixels; and wherein the Mth gate line of the gate lines is coupled to a gate electrode of the Mth first film transistor of the first thin film transistors, the (M+1)th gate line of the plurality of gate lines is coupled to a gate electrode of the Mth second thin film transistor of the second thin film transistors and a gate electrode of the (M+1)th first thin film transistor of the first thin film transistors, and the Nth source line of the plurality of source lines is coupled to a source electrode of the second thin film transistor, wherein a source electrode of the first thin film transistor is coupled to a drain electrode of the second thin film transistor, a drain electrode of the first thin film transistor is coupled to a first pixel capacitor, the drain electrode of the second thin film transistor is coupled to a second pixel capacitor.

12. The device of claim 11, wherein the MSHD display panel comprises a color filter which comprises a plurality of red blocks, a plurality of green blocks, and a plurality of blue blocks, in which the plurality of red blocks, the plurality of green blocks and the plurality of blue blocks are interlaced with each other.

13. The device of claim 11, wherein the MSHD display panel is a liquid crystal panel.

* * * * *